US009666117B2

United States Patent
Chia et al.

(10) Patent No.: US 9,666,117 B2
(45) Date of Patent: May 30, 2017

(54) IMAGE DISPLAY DEVICE, IMAGE DISPLAY METHOD AND PROGRAM

(71) Applicant: Rakuten, Inc., Tokyo (JP)

(72) Inventors: Alex Yong-Sang Chia, Tokyo (JP); Udana Bandara, Tokyo (JP); Hiromi Hirano, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 161 days.

(21) Appl. No.: 14/764,984

(22) PCT Filed: Jan. 31, 2013

(86) PCT No.: PCT/JP2013/052275
§ 371 (c)(1),
(2) Date: Jul. 31, 2015

(87) PCT Pub. No.: WO2014/118960
PCT Pub. Date: Aug. 7, 2014

(65) Prior Publication Data
US 2015/0371582 A1    Dec. 24, 2015

(51) Int. Cl.
*G06F 21/31* (2013.01)
*G06T 3/00* (2006.01)
(Continued)

(52) U.S. Cl.
CPC ........... *G09G 3/2018* (2013.01); *G06F 21/31* (2013.01); *G06F 21/60* (2013.01); *G06T 3/00* (2013.01);
(Continued)

(58) Field of Classification Search
CPC ............. G06F 21/31; G06F 2221/2113; G09G 2340/0435; G09G 2358/00; G06T 3/00
See application file for complete search history.

(56) References Cited

U.S. PATENT DOCUMENTS 5,726,716 A * 3/1998 Egashira ............. G06T 3/00
348/580
7,222,306 B2 * 5/2007 Kaasila ............. G06F 3/0481
715/760
(Continued)

FOREIGN PATENT DOCUMENTS

| JP | 2001-016429 A | 1/2001 |
|---|---|---|
| JP | 2002-072994 A | 3/2002 |
| JP | 2009-042326 A | 2/2009 |

OTHER PUBLICATIONS

English Translation of International Search Report for PCT/JP2013/052275 dated Apr. 23, 2013.

*Primary Examiner* — Utpal Shah
(74) *Attorney, Agent, or Firm* — Hubbs, Enatsky & Inoue PLLC

(57) ABSTRACT

To make it difficult to obtain an original image based on display data. An image display device includes an image set generating unit that generates a plurality of image sets S, each including a plurality of modified images $C_j$ that are obtained by modifying an original image O, and an average of pixel values of corresponding pixels of the plurality of modified images $C_j$ included in each of the image sets S corresponding to a value of a corresponding pixel of the original image O, and an image display unit for sequentially displaying the plurality of modified images $C_j$ included in each of the image sets S by sequentially using the plurality of image sets S generated by the image set generating unit.

10 Claims, 10 Drawing Sheets

(51) Int. Cl.
*G09G 3/20* (2006.01)
*G06F 21/60* (2013.01)

(52) U.S. Cl.
CPC ........... *G06F 2221/2113* (2013.01); *G09G 2340/0435* (2013.01); *G09G 2358/00* (2013.01)

(56) References Cited

U.S. PATENT DOCUMENTS

| | | | | |
|---|---|---|---|---|
| 2009/0268089 A1* | 10/2009 | Mori | ................ | H04N 21/4854 348/459 |
| 2012/0057850 A1* | 3/2012 | Klappert | .......... | H04N 21/23424 386/278 |
| 2012/0308075 A1* | 12/2012 | Takenaka | ................ | G06F 21/10 382/100 |
| 2013/0201099 A1* | 8/2013 | Guerin | ................... | G06F 3/005 345/156 |

* cited by examiner

IMAGE DISPLAY DEVICE, IMAGE DISPLAY METHOD AND PROGRAM

CROSS REFERENCE TO RELATED APPLICATIONS

This application is a National Stage of International Application No. PCT/JP2013/052275 filed on Jan. 31, 2013. The contents of the above document is incorporated herein by reference in its entirety.

TECHNICAL FIELD

The present invention relates to an image display device, an image display method, and a program, and to a technology for preventing fraudulent acts involving acquiring an original image based on display data.

BACKGROUND ART

An image displayed on a screen of an information processor, such as an image on each page of an electronic book, can be copied by taking a screen shot. That is, image data of each page of the electronic book can be obtained by storing display data stored in a display memory.

In an attempt to prevent such fraudulent acts, Patent Literature 1 below discloses a technology for randomly selecting S for each pixel of an original image, generating a first converted image obtained by adding S to each pixel value and a second converted image obtained by subtracting S from each pixel value, and displaying these two converted images while switching them at a high speed. In accordance with this technology, even though a viewer recognizes as if the original image is displayed, a first or a second converted image is obtained by a screen shot, and thus it is possible to prevent fraudulent acquisition of original image data.

CITATION LIST

Patent Document

Patent Literature 1: JP2002-72994A

SUMMARY OF INVENTION

Technical Problem

However, the technology described in the Patent Literature 1 has a drawback that the original image can be restored by capturing screen shots to obtain the first and second converted images and averaging them.

One or more embodiments of the present invention have been conceived in view of the above, and an object thereof is to provide an image display device, an image display method, and a program that make it difficult to obtain an original image based on display data.

Solution to Problem

In order to solve the above described problems, an image display device according to the present invention includes image set generating means for generating a plurality of image sets, each including a plurality of modified images that are obtained by modifying an original image, an average of pixel values of corresponding pixels of the plurality of modified images included in each of the image sets corresponding to a value of a corresponding pixel of the original image, and image display means for sequentially displaying the plurality of modified images included in each of the image sets by sequentially using the plurality of image sets generated by the image set generating means.

The image set generating means may determine a number of the modified images included in the image sets based on a random number. Further, the image set generating means may generate the modified images based on a random number.

The image set generating means may sequentially generate the plurality of image sets, and, while the plurality of modified images included in an image set generated most recently are displayed one or more times by the image display means, may generate a subsequent image set.

An image display method according to the present invention includes an image set generating step for generating a plurality of image sets, each including a plurality of modified images that are obtained by modifying an original image, an average of pixel values of corresponding pixels of the plurality of modified images included in each of the image sets corresponding to a value of a corresponding pixel of the original image, and an image display step for sequentially displaying the plurality of modified images included in each of the image sets by sequentially using the plurality of image sets generated in the image set generating step.

A program according to the present invention causes a computer to function as image set generating means for generating a plurality of image sets, each including a plurality of modified images that are obtained by modifying an original image, an average of pixel values of corresponding pixels of the plurality of modified images included in each of the image sets corresponding to a value of a corresponding pixel of the original image, and image display means for sequentially displaying the plurality of modified images included in each of the image sets by sequentially using the plurality of image sets generated by the image set generating means. The program may be stored in a computer-readable information storage medium, such as a CD-ROM and a DVD-ROM.

DESCRIPTION OF EMBODIMENTS

An embodiment of the present invention will be described below in detail with reference to the accompanying drawings.

Figure 1:
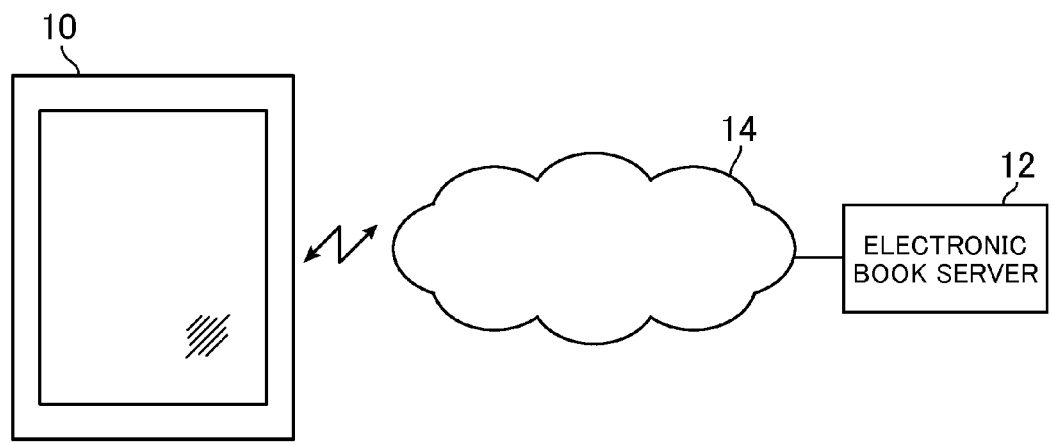
FIG. 1 is a diagram illustrating an image display device according to an embodiment of the present invention.
Figure 2:
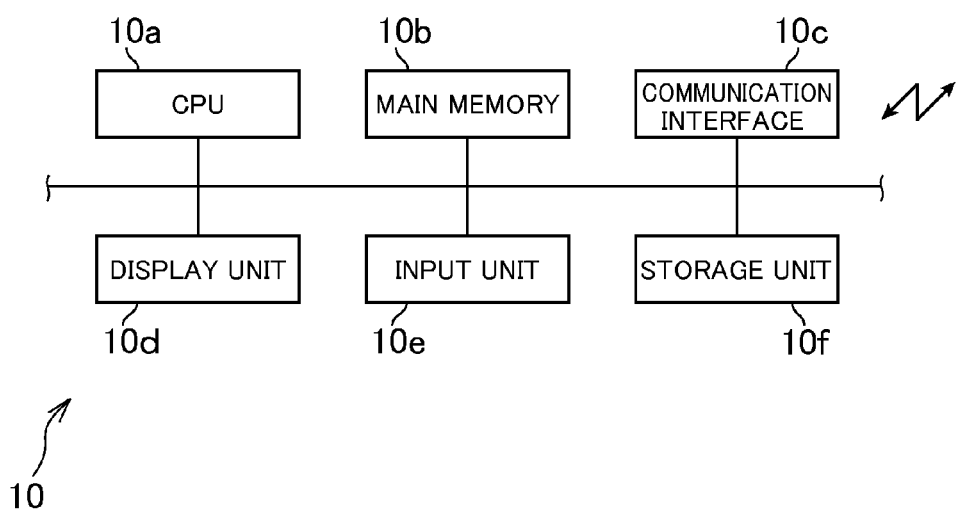
FIG. 2 is a diagram illustrating a hardware configuration of the image display device.

FIG. 1 is a diagram illustrating an image display device according to an embodiment of the present invention. The image display device 10 is a computer in various forms, such as an electronic book reader and a tablet, and has a hardware configuration in which a CPU 10a, a main memory 10b, a communication interface 10c, a display unit 10d, an input unit 10e, and a storage unit 10f are connected to a bus, as shown in FIG. 2. The CPU 10a controls each section of the device and executes various processing. The main memory 10b is volatile storage means and used for operations of the CPU 10a. The communication interface 10c accesses a data communication network 14, such as the Internet, through a communication line, such as a wireless LAN and a radio telephone line. The display unit 10d is display means such as a liquid crystal display and an organic EL display. The display unit 10d includes a display memory. When the CPU 10a stores display data (raster style) in the display memory, the display unit 10d displays an image indicated in the display data. The input unit 10e is, for example, physical keys provided to the image display device 10, and a touch panel mounted on the display surface of the display unit 10d. Data that is input by the input unit 10e is used by the CPU 10a. The storage unit 10f is non-volatile storage means, and stores an operating system (OS), data of electronic books, and an electronic book display program for displaying the electronic books. The data of electronic books and the electronic book display program may be downloaded from the data communication network 14, or read from a computer-readable information storage medium, such as a CD-ROM.

In this embodiment, as shown in FIG. 1, the image display device 10 is connected to the data communication network 14, to which the electronic book server 12 is also connected. The electronic book server 12 is a server computer that may include a CPU, a main memory, a communication interface, and a large scale storage device, and stores data of a large number of electronic books. In response to a request from the image display device 10, the electronic book server 12 sends the data of electronic books to the image display device 10. The image display device 10 stores the received electronic book data in the storage unit 10f. The electronic book display program causes the display unit 10d to display the data of electronic books stored in the storage unit 10f. In addition, the electronic book display program executes processing, such as page feeding, in accordance with a user's operation of the input unit 10e.

The OS is performed in the image display device 10, and the OS provides a screen shot function. According to the screen shot function, when a user performs specific operation using the input unit 10e, the display data stored in the display memory built in the display unit 10d is moved to the storage unit 10f. In this way, the display data stored in the storage unit 10f can be redisplayed by the display unit 10d later. Further, the display data can be sent to other image display devices by the communication interface 10c. When the data of electronic books sent from the electronic book server 12 is displayed on the display unit 10d, the display data of electronic books is stored in the display memory. With use of the screen shot function provided by the OS, the display data can be moved to the storage unit 10f, and eventually sent to other image display devices.

In order to prevent such fraudulent acts, the electronic book display program stores display data (modified image), which is obtained by adding noise to display data (original image) of an original electronic book, into the display memory of the display unit 10. As such, even though the screen shot function provided by the OS is used, only data of the electronic book added with noise can be moved to the storage unit 10f. In this regard, a plurality types of data of the electronic book added with noise are prepared, and an average value of the plurality types of data matches the data of original electronic book. As such, the plurality types of data of the electronic book added with noise are switched at short intervals and sequentially displayed, and thereby allowing the user to recognize data of original electronic book without noise as if it were displayed on the display unit 10d.

Figure 3:
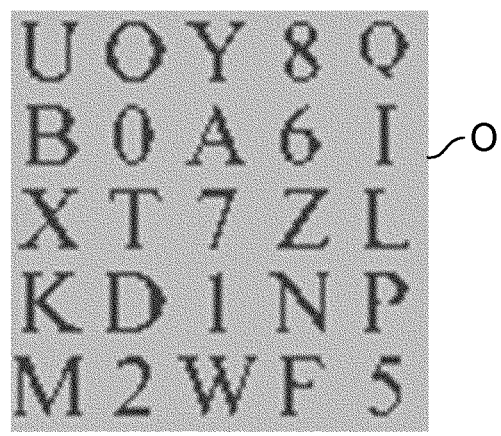
FIG. 3 is a diagram illustrating an example of an original image.

FIG. 3 shows an original image O as an example of display data indicating content of an electronic book. Here, the original image O is a 256-level gray scale image, and capital alphabet letters and numbers are described on a gray background. The original image O may be an image of one of pages of an electronic book.

When the pixel value of the position (x,y) of the original image O is O (x,y), such pixel value is in the range of 0 to 255 inclusive. The pixel value O (x,y) of the position in the background is 1 or more and less than 255, and may be, for example, about 30. On the other hand, the pixel value O (x,y) of the position in the letters and numbers is greater than such value, and may be, for example, about 200. The image display device 10 may receive the original image O in an encrypted form from the electronic book server 12.

While the original image O is provided to the user, the electronic book display program of the image display device 10 continues to generate image sets S based on the original image O. Here, each image set S includes n (n≥2) types of modified images $C_j$ (j=1–n). Specifically, the electronic book display program generates n types of noise images $N_j$ (j=1–n), and adds the generated noise images to the original image O, thereby obtaining n types of modified images $C_j$ (j=1–n). Further, in order to generate n types of noise images $N_j$, the electronic book display program generates n types of intermediate noise images $M_j$ (j=1–n), and then converts the generated intermediate noise images into n types of noise images $N_j$. In this regard, the electronic book display program randomly determines n for each image set S. The electronic book display program also randomly determines intermediate noise image $M_j$ and noise image $N_j$ under the condition described later.

Figure 4:
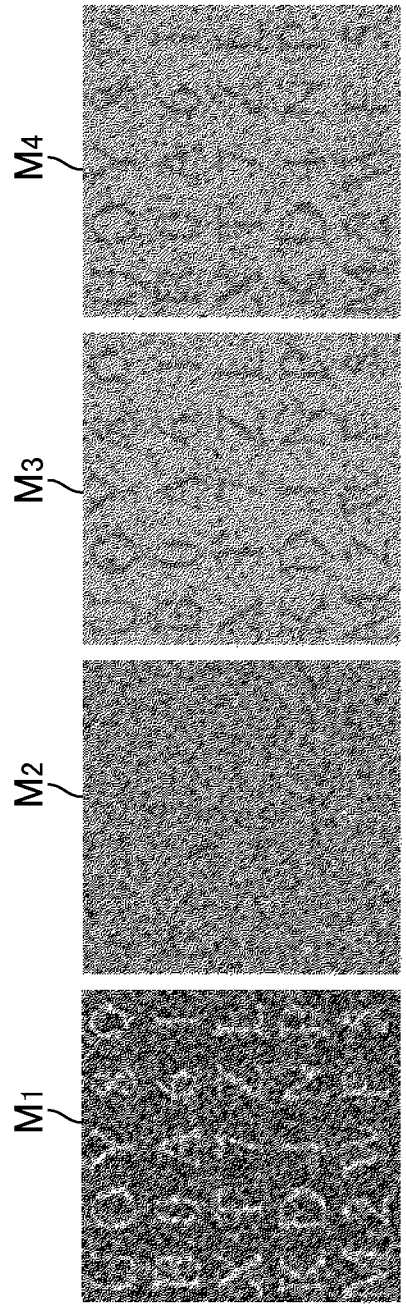
FIG. 4 is a diagram illustrating an example of an intermediate noise image.
Figure 5:
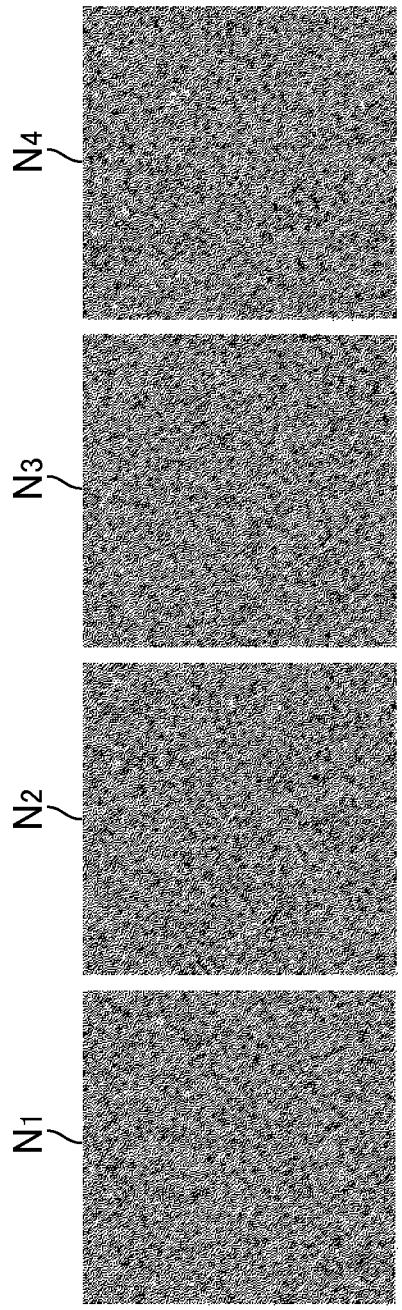
FIG. 5 is a diagram illustrating an example of a noise image.
Figure 6:
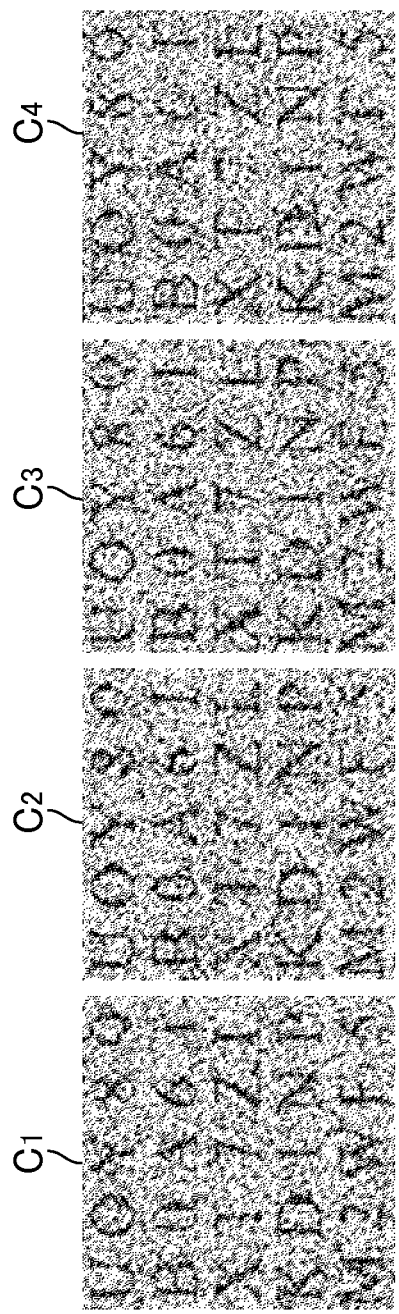
FIG. 6 is a diagram illustrating an example of a modified image.

FIGS. 4 to 6 respectively show examples of intermediate noise images $M_1$ to $M_4$, noise images $N_1$ to $N_4$, and modified images $C_1$ to $C_4$, where n=4. Here, horizontal and vertical sizes (dimensions) of the noise image $N_j$, the intermediate noise image $M_j$, the modified image $C_j$, and the original image $O_j$ are the same, and each image is a 256-level gray scale image.

When the pixel value of the noise image $N_j$ at the position (x,y) is $N_j$ (x,y), and the pixel value of the modified image $C_j$ at the position (x,y) is $C_j$ (x,y), the following expression (1) is satisfied.

$$C_j(x,y)=O(x,y)+N_j(x,y) \quad (1)$$

When all of the n types of noise images $N_j$ are viewed while being switched at short intervals, due to the human visual system, viewers perceive as if no image is displayed. That is, the following expression (2) is satisfied at any position (x,y) of the noise image $N_j$.

$$\Sigma N_j(x,y)=0 \quad (2)$$

Here, Σ is a sum from j=1 to j=n. Since the expressions (1) and (2) are satisfied, the average of pixel values $C_j$ (x,y) at any position (x,y) of the modified image $C_j$ matches the pixel value O (x,y) of the position (x,y) of the original image O. In this regard, there is an upper limit value of n in order that the human visual system works efficiently. According to the experiment of the present inventors, the upper limit value of n is about 22.

As described above, the modified image $C_j$ also has 256 levels, and needs to be represented by pixel values displayable on the display unit 10d. As such, the following expression (3) must be satisfied.

$$\alpha \leq O(x,y)+N_j(x,y) \leq \beta \qquad (3)$$

Here, $\alpha$ is the lower limit value of pixel values displayable by the display unit 10d, and $\beta$ is the upper limit value of pixel values displayable by the image display means. The display unit 10d performs 256-level gray-scale display, and thus the lower limit value $\alpha$ is 0, and the upper limit value $\beta$ is 255.

Figure 7:
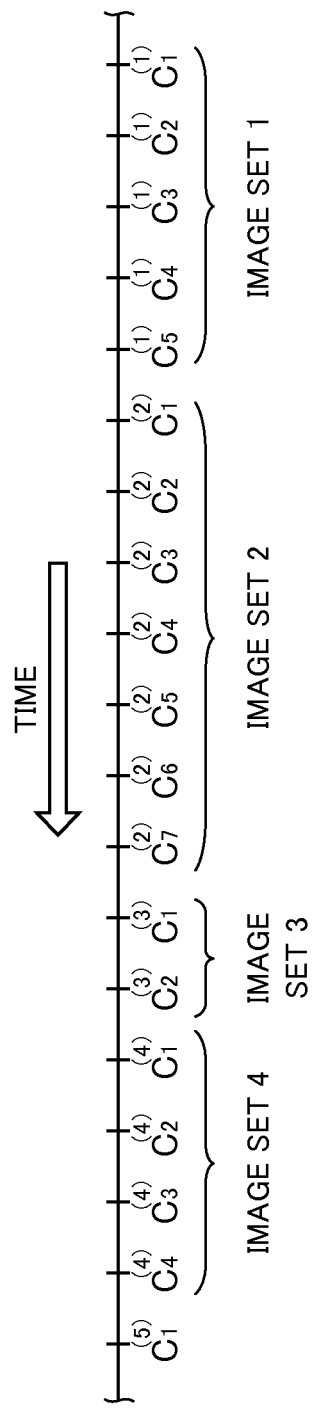
FIG. 7 is a diagram explaining an order of modified images to be displayed.

For each time an image set S is generated, the electronic book display program of the image display device 10 displays modified images $C_1$ to $C_n$ included in the generated image set in order. FIG. 7 is a diagram explaining an order of modified images to be displayed on the display unit 10d. In FIG. 7, $C_j$ (k) indicates jth modified image of kth image set. As shown in FIG. 7, a plurality of modified images included in each image set are displayed in order according to the electronic book display program. Here, the number of modified images included in an image set is randomly determined for each image set, and thus the numbers may be different from one another. As described above, components of the noise image $N_j$ of the modified image $C_j$ are not recognized by a user, and the original image O appears to be displayed on the display unit 10d as if the original image O itself is displayed.

Figure 8:
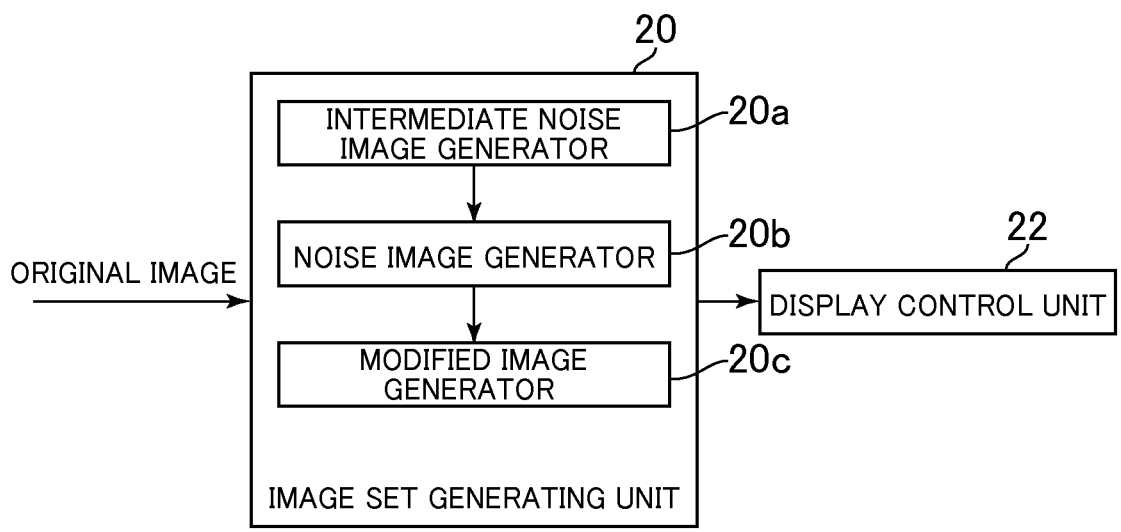
FIG. 8 is a functional block diagram of the image display device.

FIG. 8 is a functional block diagram of the image display device 10. The functional block diagram shown in FIG. 8 indicates functions that the image display device 10 has and are related to display of electronic books. The functions shown in FIG. 8 are implemented by the image display device 10, which is a computer, executing the electronic book display program.

As shown in FIG. 8, the image display device 10 includes an image set generating unit 20 and a display control unit 22, and the image set generating unit 20 includes an intermediate noise image generator 20a, a noise image generator 20b, and a modified image generator 20c.

The image set generating unit 20 sequentially generates a plurality of image sets S. Each image set S includes a plurality of modified images $C_j$ obtained by modifying the original image O. The display control unit 22 sequentially uses the image sets S generated by the image set generating unit 20 in order to sequentially display the modified images $C_j$ respectively included in the image sets S. Here, while a modified image $C_j$ included in an image set S, which is generated most recently by the image set generating unit 20, is displayed by the display control unit 22 one or more times, the image set generating unit 20 generates a subsequent image set S.

The intermediate noise image generator 20a generates intermediate noise images $M_j$ based on the original image O. The noise image generator 20b generates noise images $N_j$ based on the intermediate noise images $M_j$. As shown in the expression (1), the modified image generator 20c adds noise images $N_j$ generated by the noise image generator 20b to the original image O, thereby generating the modified images $C_j$.

Figure 9:
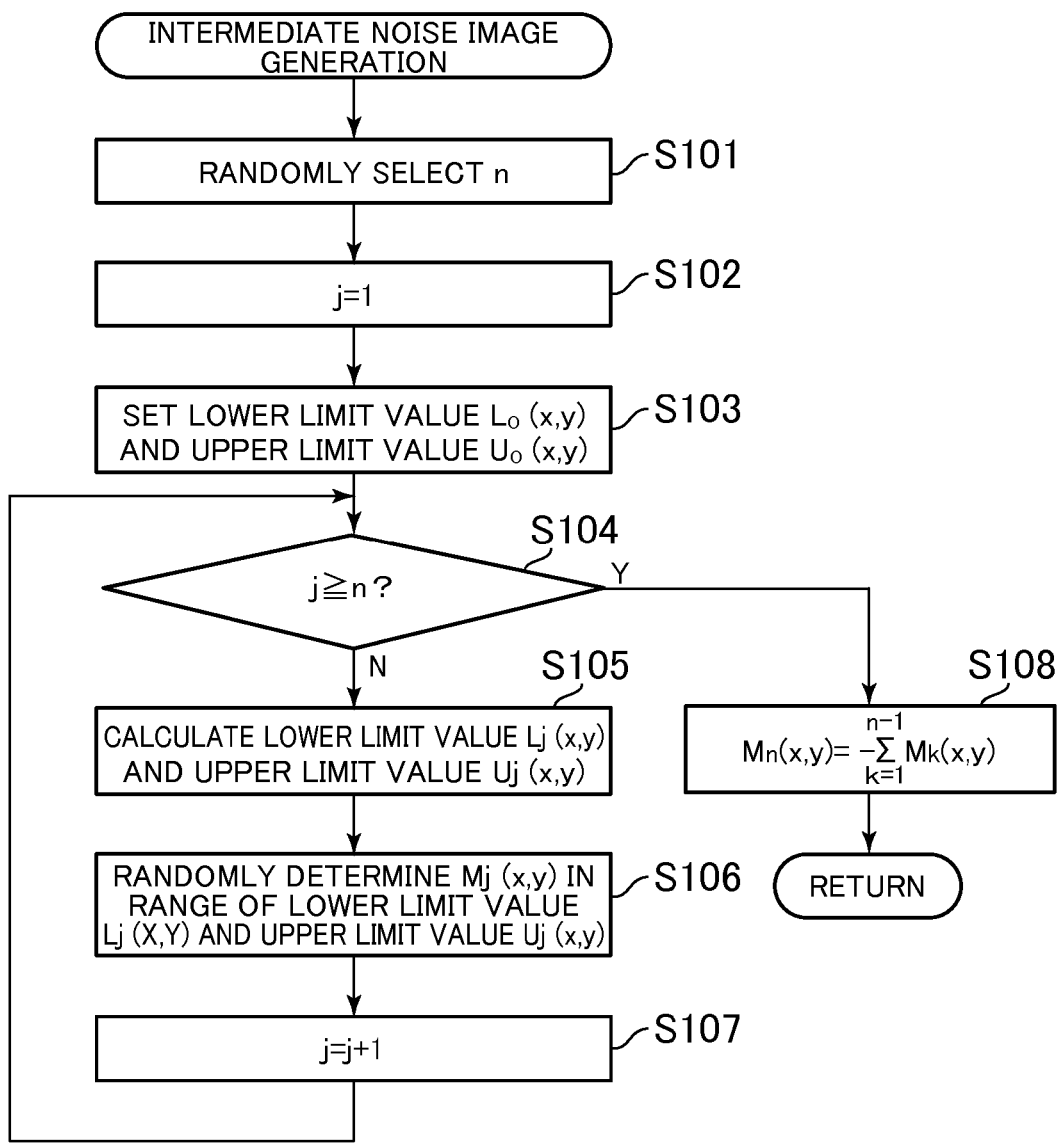
FIG. 9 is a flow chart illustrating processing for generating an intermediate noise image.

In the following, processing executed by the intermediate noise image generator 20a will be explained in detail. FIG. 9 is a flow chart illustrating the processing executed by the intermediate noise image generator 20a. As shown in FIG. 9, the intermediate noise image generator 20a generates a random number, and determines n, which is the number of modified images $C_j$ included in an image set, based on the random number (S101). Subsequently, the intermediate noise image generator 20a sets the variable j to 1 (S102). Further, the intermediate noise image generator 20a calculates $L_0$ (x,y) and $U_0$ (x,y), which respectively are initial values of the lower limit value $L_j$ (x,y) and the upper limit value $U_j$ (x,y), in the allowable range of pixel values $M_j$ (x,y) of intermediate images $M_j$ described later, for all positions (x,y) based on the following expressions (4) and (5) (S103).

$$L_0(x,y)=\alpha-O(x,y) \qquad (4)$$

$$U_0(x,y)=\beta-O(x,y) \qquad (5)$$

Subsequently, if the variable j is not equal to or more than n (S104), the intermediate noise image generator 20a calculates the lower limit values $L_j$ (x,y) and the upper limit values $U_j$ (x,y) of pixel values $M_j$ (x,y) for all positions (x,y) based on the following expressions (6) and (7) (S105). Here, $\Sigma$ is a sum from k=1 to j–1.

$$L_j(x,y)=-\Sigma M_k(x,y)-(n-j)U_{j-1}(x,y) \qquad (6)$$

$$U_j(x,y)=-\Sigma M_k(x,y)-(n-j)L_{j-1}(x,y) \qquad (7)$$

The intermediate noise image generator 20a then randomly determines $M_j$ (x,y) in the range of the lower limit value $L_j$ (x,y) and the upper limit value $U_j$ (x,y) (S106). Specifically, the intermediate noise image generator 20a generates random numbers $\gamma$ in the range of 0 to 1 for all positions (x,y), and calculates pixel values $M_j$ (x,y) by substituting the $\gamma$ for the following expression (8).

$$M_j(x,y)=\gamma \times L_j(x,y)+(1-\gamma) \times U_j(x,y) \qquad (8)$$

Subsequently, the intermediate noise image generator 20a increments the variable j by 1 (S107), and returns to the processing of S104. If it is determined that the variable j is n or more in S104, the intermediate noise image generator 20a calculates $M_n$ (x,y) for all positions (x,y) based on the following expression (9) (S108), and finishes the processing. Here, $\Sigma$ is a sum from k=1 to n–1.

$$M_n(x,y)=-\Sigma M_k(x,y) \qquad (9)$$

The pixel value $M_j$ (x,y) of the intermediate noise image $M_j$ satisfies the following expression similarly to the pixel value $N_j$ (x,y) of the noise image $N_j$. Here, $\Sigma$ is a sum from j=1 to n.

$$\Sigma M_j(x,y)=0 \qquad (10)$$

The expression (9) is derived from the expression (10). The $M_j$ (x,y) is a value obtained by inverting the sign of the sum of $M_1$ (x,y) to $M_{j-1}$ (x,y), which have been determined in the processing of S106, and $M_{j+1}$ (x,y) to $M_n$ (x,y) which are to be determined in the subsequent processing of S106. Here, assuming that the upper limit value and the lower limit value of $M_{j+1}$ (x,y) to $M_n$ (x,y), which are to be determined in the processing of S106, respectively are $U_{j-1}$ (x,y) and $L_{j-1}$ (x,y) and this leads to the expressions (6) and (7).

Figure 10:
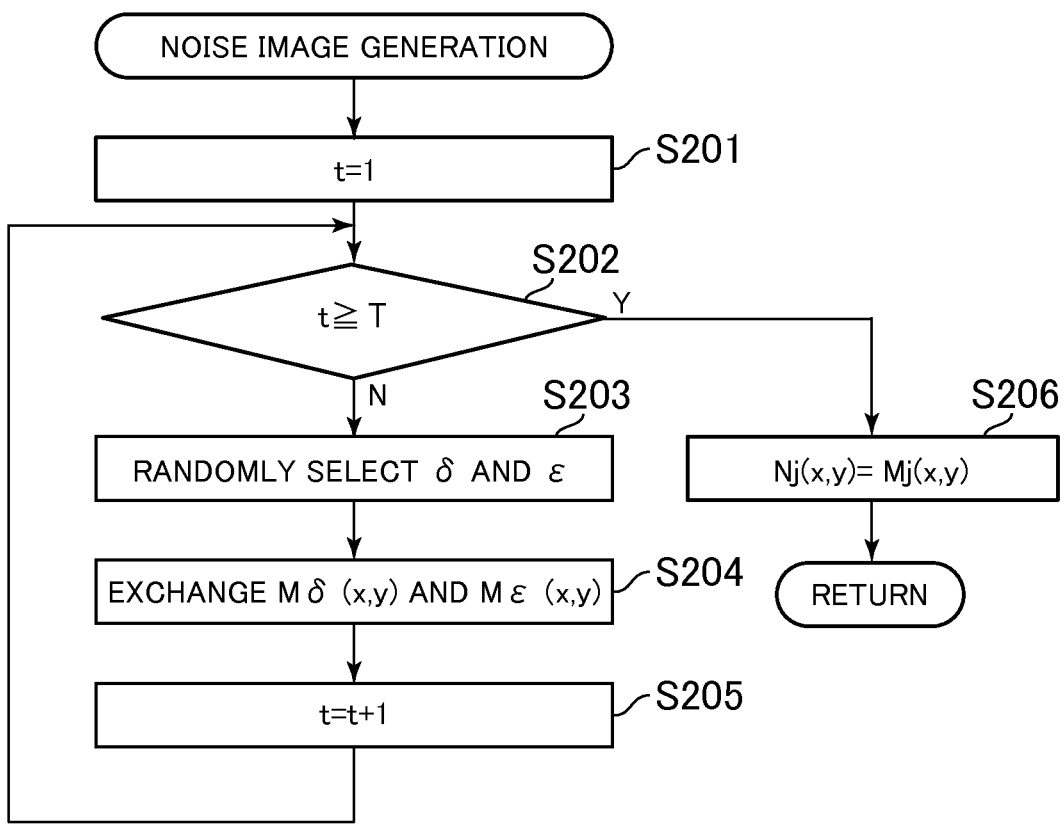
FIG. 10 is a flow chart illustrating processing for generating a noise image.

Next, processing of the noise image generator 20b will be explained in detail. FIG. 10 is a flow chart illustrating processing executed by the noise image generator 20b. The processing in FIG. 10 shows that the pixel values $M_1$ (x,y) to $M_n$ (x,y) at the positions (x,y) of the intermediate noise images $M_1$ to $M_n$ are randomly exchanged and thereby the pixel values $N_1$ (x,y) to $N_n$ (x,y) at the positions (x,y) of the noise images $N_1$ to $N_n$ are obtained. The processing shown in FIG. 10 is repeated with respect to all the positions (x,y). In this processing, the noise image generator 20b sets the variable t to one (S201), generates two random numbers in the range of 1 to n unless the variable t is not equal to or more than T, which is the predetermined number of repetition times (S202), and sets variable δ and variable ε to the generated numbers (S203). Subsequently, the noise image generator 20b exchanges the pixel value $M_δ$ (x,y) of the δth intermediate noise image $M_δ$ and the pixel value $M_ε$ (x,y) of the εth intermediate noise image $M_ε$ (S204). The noise image generator 20b then increments the variable t by 1 (S205), and returns to the processing of S202. In the processing of S202, if it is determined that the variable t is equal to or more than the repetition times T, the pixel values $M_1$ (x,y) to $M_n$ (x,y) of the intermediate noise images $M_1$ to $M_n$ are set to the pixel values $N_1$ (x,y) to $N_n$ (x,y) of the noise images $N_1$ to $N_n$.

Subsequently, the processing of S201 to S206 is repeated for all of the positions (x,y). The number of the repetition times T may be any number, but preferably equal to or more than n.

Figure 11:
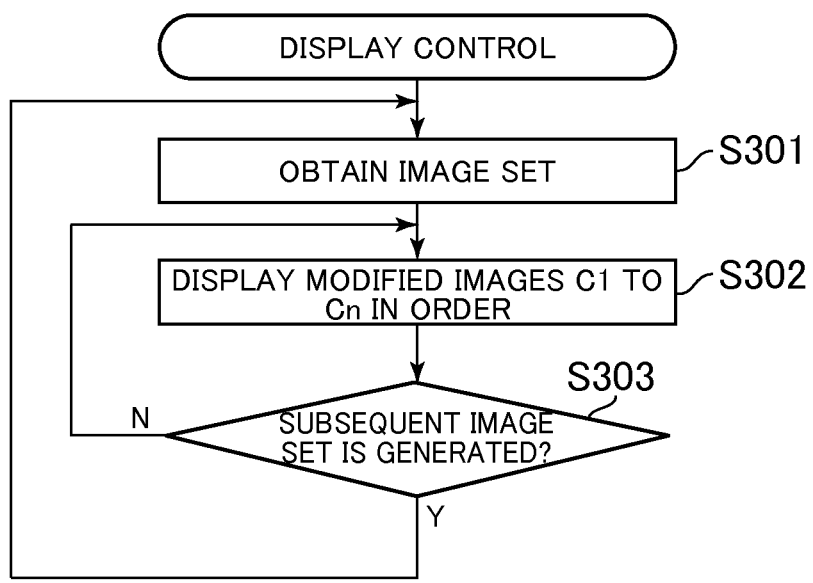
FIG. 11 is a flow chart illustrating display control of a modified image.

Next, processing of the display control unit 22 will be explained in detail. FIG. 11 is a flow chart illustrating processing executed by the display control unit 22. As shown in FIG. 11, the display control unit 22 obtains an image set S generated by the modified image generator 20c of the image set generating unit 20 (S301). The display control unit 22 sequentially displays, by the display unit 10d, modified images $C_1$ to $C_n$ included in the image set S at a predetermined time interval (S302). When all of the modified images $C_1$ to $C_n$ are displayed, the display control unit 22 checks whether a subsequent image set S is generated by the modified image generator 20c (S303). If it is not generated yet, the processing in S302 is executed again. If the subsequent image set S is generated, the display control unit 22 returns to S301, obtains the latest image set S, and executes the subsequent processing.

According to the image display device 10 described above, a plurality of image sets S are sequentially generated and the modified images $C_j$ included in the image sets S are displayed in order. As such, among from the images displayed one after another, unless all of the modified images $C_j$ of one of the image sets S are obtained by screen shots, it is not possible to restore the original image O. Since it is difficult to specify a time period in which one image set S is displayed, fraudulently obtaining the original image by screen shots can be prevented.

Specifically, in the above embodiment, the number of modified images $C_j$ included in one image set S is determined by a random number, which makes more difficult to specify a time period in which one image set S is displayed.

Further, as described above, there is a limit of the number n (about 22) of modified images $C_j$ included in one image set S. As such, if one image set S is repeatedly presented to a user, the user may highly likely obtain all types of the modified images $C_j$ and restore the original image O. On the other hand, this embodiment uses a plurality of image sets S, and thereby increasing the number of types of modified images presented to a user, and making it difficult for the user to restore the original image O.

The present invention is not to be limited to the above described embodiment and can be changed as appropriate. For example, although a 256-level gray scale image is used as an original image O in the above example, any other form of image (e.g., color image) may of course be used. In addition, the original image O is not limited to an image indicating a page of an electronic book, but may be any image, such as an image included in a web page.

The number of modified images $C_j$ included in one image set S may be fixed. Further, the image set generating unit 20 may be implemented in the electronic book server 12, instead of being implemented in the image display device 10. In this case, the electronic book server 12 may send modified images $C_j$ of image sets S to the image display device 10, and the image display device 10 may sequentially display the images for each image set.

Further, a generating method of the modified images $C_j$ is not limited to the above described method, but various generating methods may be employed. According to the above embodiment, the modified images $C_j$ are obtained by adding noise to all over the original image O, although the modified images $C_j$ may be obtained by adding noise to a part of the original image O. For example, an area showing particular content, such as human face or characters, may be specified in the original image O, and only such area may be added with noise. In this case, pixel values M (x,y) and pixel values N (x,y) are values greater than O only at the positions (x,y) in the specified area, and are set to 0 at the other positions (x,y).

Further, in the above discussion, an image set S is repeatedly used until a subsequent image set S is generated, and modified images $C_j$ included in the image set S are displayed, although the number of times each image set S is used in succession may be a fixed value equal to or greater than 2.

In this case, preferably the number of times is determined such that total display time in which an image set S is used fully exceeds generation time of the image set S. In addition, the number of times the image set S is used in succession may be prepared for each number n of modified images $C_j$ included in the image set S. Alternatively, the number of times the image set S is used in succession may be determined based on a random number.

The invention claimed is:

1. An image display device, comprising:
   at least one processor;
   a display; and
   at least one memory device that stores a plurality of instructions, which when executed by the at least one processor, causes the at least one processor to execute operations comprising:
      generating a plurality of image sets, each including a plurality of modified images that are obtained by modifying an original image, wherein an average of pixel values of corresponding pixels of the plurality of modified images included in each of the image sets corresponds to a value of a corresponding pixel of the original image, and numbers of the modified images included in each of the image sets are different from each other; and
      sequentially using the plurality of image sets to display on the display the plurality of modified images included in each of the image sets.

2. The image display device according to claim 1, wherein the operations comprise determining the number of the modified images included in the image set based on a random number.

3. The image display device according to claim 1, wherein the operations comprise generating the modified images based on a random number.

4. The image display device according to claim 1, wherein the operations comprise generating a subsequent image set while displaying, one or more times, the plurality of modified images included in an image set generated most recently.

5. The image display device according to claim 1, wherein, when a pixel value at a position (x, y) of an original image O is O (x,y), a pixel value at a position (x,y) of jth modified image $C_j$ included in the image sets is $C_j$ (x,y), and a pixel value at a position (x,y) of jth noise image $N_j$ included in the image sets is $N_j$ (x,y), the following expression is established:

$$O(x,y)+N_j(x,y)=C_j(x,y)$$

$$\Sigma N_j(x,y)=O$$

where n is a number of modified images included in the image sets, and $\Sigma$ is a sum from j=1 to n.

6. The image display device according to claim 5, wherein the following expression is established:

$$\alpha \leq (x,y)+O(x,y) \leq \beta$$

where $\alpha$ is a lower limit value of a pixel value displayable by the image display means, and $\beta$ is a upper limit value of a pixel value displayable by the image display means.

7. The image display device according to claim 6, wherein, when a pixel value at a position (x,y) of jth intermediate noise image $M_j$ is $M_j$ (x,y), a lower limit value $L_j$ (x,y) and a upper limit value $U_j$ (x,y) of the pixel value are sequentially calculated by $$L_j(x,y)=-\Sigma M_k(x,y)-(n-j)U_{j-1}(x,y)$$

$$U_j(x,y)=-\Sigma M_k(x,y)-(n-j)L_{j-1}(x,y)$$

the pixel value $M_j$ (x,y) is determined within a range of the lower limit value $L_j$ (x,y) and the upper limit value $U_j$ (x,y), and the plurality of modified images $C_j$ are generated based on the pixel value $M_j$ (x,y), where $\Sigma$ is a sum from k=1 to j−1, $U_0$ (x,y) is $\beta$-O (x,y), and $L_0$ (x,y) is $\alpha$-O (x,y).

8. The image display device according to claim 7, wherein a pixel value $M_\delta$ (x,y) at a position (x,y) of $\delta$th intermediate noise image $M_\delta$ and a pixel value $M_\epsilon$ (x,y) at a position (x,y) of 8th intermediate noise image $M_\epsilon$ are interchanged so as to generate the plurality of noise images $N_j$, and whereby the plurality of modified images $C_j$ are generated (where $\delta$ and $\epsilon$ are random numbers in a range of 1 to n inclusive).

9. An image display method, comprising:

generating with one or more processors a plurality of image sets, each including a plurality of modified images that are obtained by modifying an original image, wherein an average of pixel values of corresponding pixels of the plurality of modified images included in each of the image sets corresponds to a value of a corresponding pixel of the original image, and numbers of the modified images included in each of the image sets are different from each other; and sequentially displaying on a display the plurality of modified images included in each of the image sets by sequentially using the plurality of image sets.

10. A non-transitory computer readable storage medium storing a program for causing a computer to function as:

image set generating means for generating a plurality of image sets, each including a plurality of modified images that are obtained by modifying an original image, wherein an average of pixel values of corresponding pixels of the plurality of modified images included in each of the image sets corresponds to a value of a corresponding pixel of the original image, and numbers of the modified images included in each of the image sets are different from each other; and image display means for sequentially displaying the plurality of modified images included in each of the image sets by sequentially using the plurality of image sets generated by the image set generating means.

* * * * *